United States Patent [19]
Salinaro et al.

[11] Patent Number: 5,275,738
[45] Date of Patent: Jan. 4, 1994

[54] FILTER DEVICE FOR ACIDS AND PROCESS FOR FILTERING INORGANIC ACIDS

[75] Inventors: Richard F. Salinaro, Hastings-On-Hudson; Peter J. Degen, Huntington; Joseph A. Gregg, Glen Head, all of N.Y.

[73] Assignee: Pall Corporation, Glen Cove, N.Y.

[21] Appl. No.: 896,664

[22] Filed: Jun. 10, 1992

[51] Int. Cl.$^5$ ............................................. B01D 61/00
[52] U.S. Cl. .................................... 210/653; 210/650; 210/654; 210/500.42; 210/490; 210/321.6; 264/49; 264/48
[58] Field of Search ........... 210/321.6, 321.72, 321.75, 210/321.77, 321.84, 321.86, 500.42, 490, 650, 651, 652, 653, 654; 264/48, 49; 525/366, 326.4; 428/315.7

[56] References Cited

U.S. PATENT DOCUMENTS

| | | |
|---|---|---|
| 3,809,669 | 5/1974 | Rainer . |
| 3,930,886 | 1/1976 | Mesiti et al. ........................... 264/49 |
| 4,203,848 | 5/1980 | Grandine, II .................. 210/500.42 |
| 4,340,482 | 7/1982 | Sternberg ...................... 210/500.42 |
| 4,618,533 | 10/1986 | Steuck .............................. 428/315.7 |
| 4,678,842 | 7/1987 | Sandler ........................... 525/359.1 |
| 4,740,562 | 4/1988 | Menke et al. ....................... 525/366 |
| 4,776,959 | 10/1988 | Kasai et al. ..................... 210/500.42 |
| 4,810,384 | 3/1989 | Fabre et al. .................... 210/500.42 |
| 4,845,132 | 7/1989 | Masuoka et al. ..................... 210/490 |
| 4,861,480 | 8/1989 | Berardo et al. ..................... 210/490 |
| 4,863,604 | 9/1989 | Lo et al. ............................. 210/490 |
| 4,923,901 | 5/1990 | Koester et al. ....................... 521/53 |
| 4,943,373 | 7/1990 | Onishi et al. ................... 210/500.42 |
| 5,019,260 | 5/1991 | Gsell et al. ......................... 210/654 |
| 5,028,337 | 7/1991 | Linder et al. ....................... 210/654 |
| 5,032,218 | 7/1991 | Dobson .............................. 156/642 |
| 5,032,331 | 7/1991 | Onishi et al. ................... 210/500.42 |
| 5,151,193 | 9/1992 | Grobe et al. ....................... 210/490 |

FOREIGN PATENT DOCUMENTS 58-93734  6/1983  Japan ............................. 210/500.42

OTHER PUBLICATIONS

"Phase Transfer Catalysis in Dehydrofluorination of Poly (vinylidene Fluoride) by Aqueous Sodium Hydroxide Solutions"; Journal of Polymer Science; Polymer Chemistry Edition, vol. 21 pp. 3443-3451 (1983).

"Synthesis of a Two-Dimensional Array of Organic Functional Groups: Surface-Selective Modification of Poly(vinylidene fluoride)"; American Chemcial Society; 1984.

"Vinylidene Fluoride Polymers"; Encyclopaedia of Polymer Sci. and Tech.; vol. 14, pp. 612-613, 1971.

"Fluoropolymer Surface Studies"; Journal of Colloid and Interface Science; vol. 47, No. 3, pp. 651-660; Jun. 1974.

"Mechanism of Amine Crosslinking of Fluoroelastomers, I. Solution Studies"; Journal of Polymer Science; vol. XLV, pp. 405-413; (1960).

Primary Examiner—Robert A. Dawson
Assistant Examiner—Ana M. Fortuna
Attorney, Agent, or Firm—Leydig, Voit & Mayer

[57] ABSTRACT

A PVDF membrane exposed to a quarternary ammonium hydroxide solution retains it hydrophobicity and resistance to corrosive environments, yet spontaneously and completely wets with concentrated sulfuric and nitric acids. The modified membrane is incorporated into filtration devices that are in situ integrity testable in concentrated inorganic mineral acids.

25 Claims, 1 Drawing Sheet $K_L$ PLOT FOR EXAMPLES 6,7,8, & 9

FIGURE 1

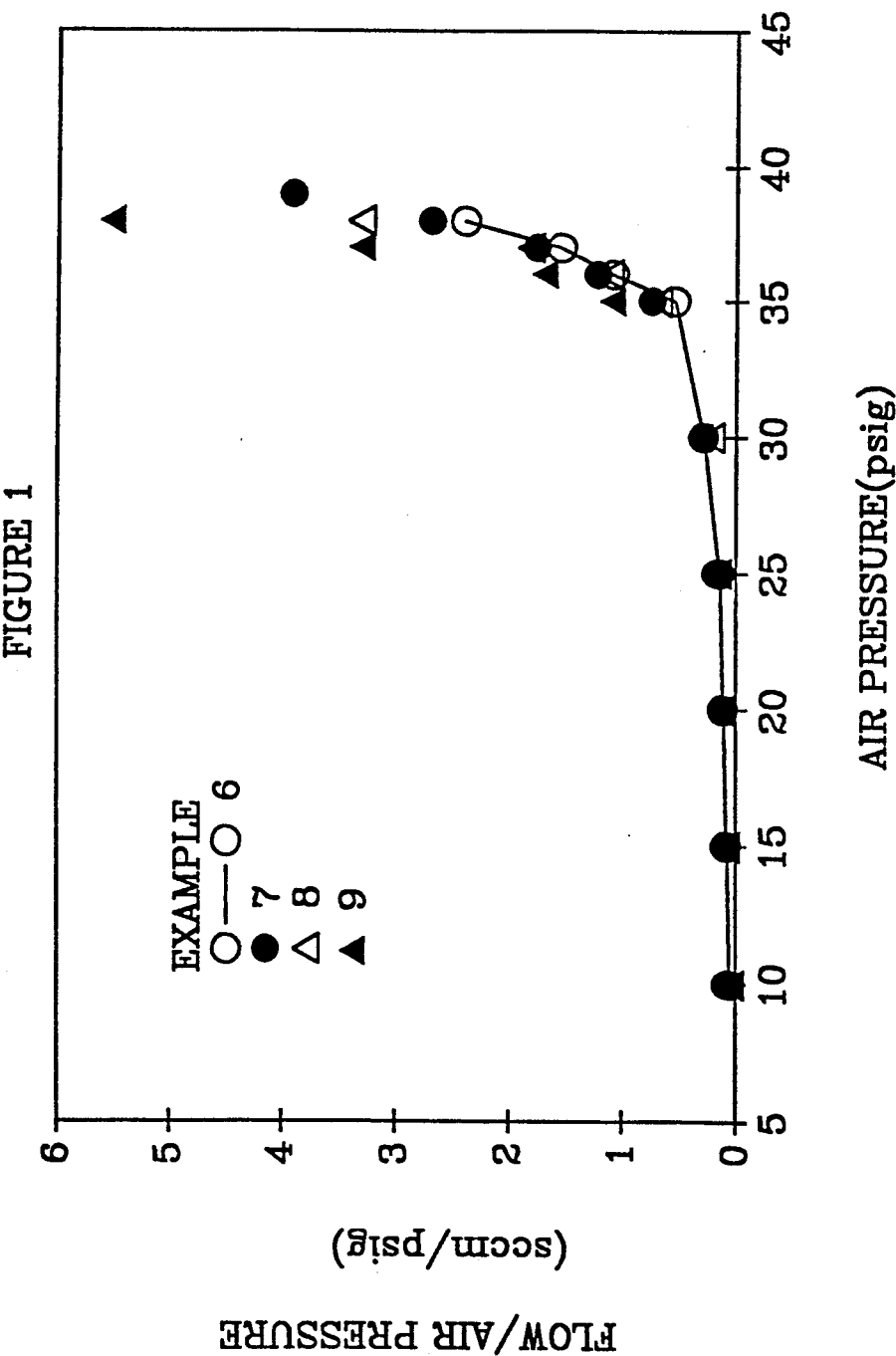

FILTER DEVICE FOR ACIDS AND PROCESS FOR FILTERING INORGANIC ACIDS

FIELD OF THE INVENTION

This invention pertains to a filter device for the removal of particulate contaminants present in inorganic mineral acids. More particularly, this invention relates to a filtration system and method for the removal of particulates and contaminants from sulfuric acid.

BACKGROUND OF THE INVENTION

Many industries utilize as a processing fluid, among other things, a contaminant-free inorganic mineral acid such as sulfuric or nitric acid. Sulfuric acid, for instance, is considered the commodity chemical produced in highest quantity worldwide. The filtration of such processing fluids is a formidable task, replete with a number of problems. Inorganic mineral acids, by their nature, are highly corrosive, polar substances; properties that have made it difficult to design systems which offer efficient, economical, integrity testable filtration in a point-of-use filter.

In critical processes involving fluid filtration, e.g., the filtration of parenteral pharmaceuticals, ultra pure water, and microelectronics processing fluids, one must achieve the highest possible assurance of filter integrity and contaminant removal efficiency. An example of an industry-accepted non-destructive integrity test is the "forward flow test." A forward flow test provides an objective and quantifiable method of determining filter integrity during operating conditions (in situ). Unless integrity testing is performed under operating conditions, there can be no assurance that the filter functions as intended and as required. In order to perform an in situ forward flow test, the filter must spontaneously and completely wet with the fluid to be filtered. Thus an in situ integrity testable filter for inorganic mineral acids must not only remain inert to the corrosive action of the acid, it must also spontaneously and completely wet with the acid.

Prior to the present invention, no one has been able to develop a polymeric filter medium that is both resistant to the corrosive environment of a concentrated inorganic mineral acid and capable of spontaneously and completely wetting with the acid, thereby making it in situ integrity testable. The need for such filter devices has recently become critical in a number of industries. For instance, there is a need for in situ integrity testable filters for inorganic mineral acids in the integrated circuit industry. During the manufacture of advanced microelectronic devices sulfuric acid is utilized as a processing fluid, usually at high concentrations. For purposes of this disclosure, the term concentrated inorganic mineral acid is intended to include sulfuric acid having a concentration of about 85% and greater, or nitric acid having a concentration of about 70% and greater. Concentrations of 96% sulfuric acid are common and typical in the integrated circuit industry.

Integrated circuit production involves hundreds of steps in which silicon wafers are repeatedly exposed to processes such as lithography, doping, and deposition of materials. In addition, numerous etching and cleaning steps are carried out by direct contact of the wafer with concentrated sulfuric acid. Contamination alters the semiconductive nature of the silicon or disturbs the intended circuit design, thereby reducing the yield of integrated circuits. It is, therefore, imperative that the sulfuric acid be free from particulates and contaminants, and it is highly desirable that the integrity of the filters be tested in order to prevent the production of manufactured items with a high degree of defects. Consequently, this industry has developed some of the most stringent requirements concerning the purity of processing fluids. Filtration systems are employed at point-of-use as well as at the point-of-distribution of the sulfuric acid.

A point-of-use filter processes fluid which is to be utilized immediately in a localized manufacturing step. Point-of-use filters used for sulfuric acid must remove micro particulates without themselves adding contaminants, i.e., exhibit low levels of ionic and total organic carbon (TOC) extractables. In addition, the effluent sulfuric acid from point-of-use filters must approach a high level of purity as quickly as possible, for both economic and environmental reasons.

Concentrated sulfuric acid is highly corrosive. All components of a filter for sulfuric acid must be resistant to the chemical action of the acid during short term as well as long term exposure, so that the filter does not leach ionic or organic extractables. A colorimetric assay, wherein the transference of color to the filtered sulfuric acid is quantified, is a useful method for detecting if a filter leaches unacceptable levels of extractables.

For example, the American Public Health Association (hereinafter referred to as APHA) has published a standard method for the examination of water and waste water based upon the visual comparison of the sample with commercially available Hazen Color Discs. This method is also utilized by industry for the examination of various chemical reagents as described in ASTM standard method D 1209-69. For example, the American Chemical Society Specification for sulfuric acid (95% to 98%) is an APHA color grade of 10 or less.

It is also desirable that filter elements for concentrated inorganic mineral acids be comprised of polymeric membranes. Such elements offer ease and economy of use, safety, excellent flow characteristics, and the ability to remove very small contaminants due to the high filtration performance of such membranes. Several fluoropolymers are known to be resistant to the corrosive actions of concentrated inorganic mineral acids. These include, for instance, (poly) vinylidene difluoride (PVDF) and (poly) tetrafluoroethylene (PTFE). Microporous membranes made from such fluoropolymers are currently used for the filtration of sulfuric acid. For example, PTFE microporous membranes are used for concentrated sulfuric acid filtration. These PTFE filters exhibit a high level of resistance to sulfuric acid and, if appropriately designed, an acceptable level of extractables, as indicated by the APHA color test. However, the media of these filters do not spontaneously and completely wet with sulfuric acid, and are not, therefore, in situ integrity testable in inorganic mineral acids. PTFE membranes do not wet with high surface tension fluids, such as concentrated sulfuric acid, due to the hydrophobic nature of these membranes. Consequently, flow of concentrated sulfuric acid through these filters cannot be initiated without first employing complex and dangerous pre-wetting procedures.

The current procedure used to wet fluoropolymeric filter media with a concentrated inorganic mineral acid, e.g., sulfuric acid, is time consuming, expensive, contaminates the acid, and is dangerous. The filter medium must first be pre-wet with a fluid having a low surface tension in order to overcome the medium's resistance to wetting with liquids having high surface tensions. Typical pre-wetting liquids are alcohols, such as ethanol or isopropanol. Once the membrane has been pre-wet the alcohol must be removed by flushing with deionized water. If the alcohol is not removed from the membrane, sulfuric acid will react with the alcohol resulting in the introduction of undesirable chemicals. After flushing with water, the membrane must be wet with a dilute acid by replacing the water in the membrane pores with a dilute acid solution. Flushing with a dilute acid prevents the build up of extreme heat (having the potential to damage the membrane) that occurs when concentrated sulfuric acid is mixed with water. The last step involves wetting the membrane pores with concentrated sulfuric acid. Only after this pre-wetting procedure is completed, which results in a great deal of waste, can the filter be utilized to remove particulates and contaminants from the sulfuric acid. These filters are not in situ integrity testable, however, because they do not spontaneously and completely wet with the acid.

In the microelectronics industry, contamination of processing fluids leads to high rates of defective product. As a result, the necessity for point-of-use or point-of-distribution filters which overcome the problems associated with filtering concentrated inorganic mineral acids has grown. Filter devices currently available for filtering concentrated inorganic mineral acids do not spontaneously and completely wet with the acids, and are therefore, not in situ integrity testable. Furthermore, some of the filters leach significant levels of TOC or ionic species (demonstrable as a high level of color transmission to the effluent).

SUMMARY OF THE INVENTION

The present invention provides a polymeric filter device that is in situ integrity testable in a concentrated inorganic mineral acid, and efficiently removes particulates and contaminants from such acids. Filter devices in accordance with this invention comprise a housing having an inlet and an outlet, and defining a liquid flow path between the inlet and the outlet, and a (poly) vinylidene difluoride (PVDF) porous medium positioned within the housing, for example across the fluid flow path, wherein the PVDF spontaneously and completely wets with an inorganic mineral acid and is effective in the removal of contaminants from an inorganic mineral acid.

The medium in accordance with this invention comprises a microporous PVDF membrane that has been modified. It has been discovered that the modification of the PVDF yields a filter medium that retains its resistance to concentrated inorganic mineral acid, exhibits little or no change in water wetting characteristics, yet, surprisingly, spontaneously and completely wets with sulfuric acid having a concentration of about 85% and higher. The medium of this invention is in situ integrity-testable in concentrated sulfuric acid by virtue of its modified wetting characteristics.

Filter devices made according to this invention are chemically stable in the presence of highly corrosive fluids and as a result their filtrates exhibit low levels of extractable contaminants, measurable as low color transmission utilizing the APHA color scale. The housing of the devices of this invention may be formed from any suitable material which is compatible with the fluid being filtered, e.g., polypropylene.

Numerous porous filter media configurations are taught including sheet membranes, corrugated membranes, and membrane discs. The membranes of this invention may be supported by non-woven webs. Non-woven webs used as support and drainage material may comprise PVDF fibers, and are therefore also capable of being modified so that the entire filter element spontaneously and completely wets with concentrated acid. This ability to completely wet makes the filter devices of this invention in situ integrity testable with concentrated inorganic mineral acids.

This invention further provides a method for the removal of contaminants present in concentrated sulfuric acid comprising passing the sulfuric acid through a filter element having a porous medium that spontaneously and completely wets with the acid and is effective in the removal of contaminants from concentrated sulfuric acid.

DESCRIPTION OF THE FIGURE

FIG. 1 is a plot of the $K_L$ curves of three in situ forward flow integrity tests and one control test.

DESCRIPTION OF THE INVENTION

The filter devices of the present invention spontaneously and completely wet with a concentrated inorganic mineral acid and are in situ integrity testable in the acid. These filter devices are effective in filtering particulates and contaminants present in such acids without leaching unacceptable levels of additional contaminants.

Polymers suitable for forming the membranes of the present invention must be resistant to the chemical and corrosive action of concentrated inorganic mineral acids such as sulfuric and nitric acid and they must spontaneously and completely wet with the acid. It is well known that fluoropolymers such as PTFE, PVDF, and fluorinated ethylene propylene copolymer (FEP) are resistant to concentrated acids, some at elevated temperatures. However, in order to be integrity testable, the media of the present invention must spontaneously and completely wet with the acid. The fluoropolymers mentioned above are hydrophobic, i.e. they do not wet with water, and they do not spontaneously and completely wet with a concentrated inorganic mineral acid.

The ability of a solid surface to be wetted with a liquid is believed by those skilled in the art to depend upon the surface tension of the liquid and the surface free energy of the solid surface. In general, if the surface tension of the liquid is less than the surface free energy of the solid surface, the surface will be spontaneously wetted by that liquid.

The empirical wetting property of a porous membrane can be easily determined by those skilled in the art. For example, U.S. Pat. No. 4,976,861 discloses a method that places drops of standard liquids of different surface tension on a porous medium and then observes whether any of the liquids wet the medium. Liquids of successively higher or lower surface tension are applied until a pair is identified, one liquid wetting and the other not wetting.

For the purposes of this invention, a porous membrane is spontaneously and completely wetted when a drop of test liquid placed on the membrane is drawn into the porous structure of the membrane and the drop disappears into the membrane within a few seconds without the application of external pressure. For example, the critical wetting surface tension, CWST, of a microporous PVDF membrane such as EMFLON II®, commercially available from Pall Corporation, is approximately 31 dynes/cm, whereas the critical surface tension of water is approximately 72 dynes/cm. Water will not spontaneously and completely wet this membrane, i.e., a drop of water will remain beaded upon the surface, not soaking into the porous structure of the membrane, because the membrane is hydrophobic. The surface tension of concentrated inorganic mineral acids are high compared to fluoropolymeric media, and a drop of a concentrated inorganic mineral acid will not spontaneously and completely wet such media.

It has been discovered that certain fluoropolymeric filter media, such as PVDF, can be modified so that the apparent surface energy and corrosive resistance are unaltered, yet the modified medium wets spontaneously and completely with a concentrated inorganic mineral acid. This transformation is achieved by chemical modification of the surfaces of the membrane which includes all surfaces that are exposed to fluid flow. Surprisingly, the modified membrane, although wettable in concentrated inorganic mineral acids, retains its hydrophobic nature, i.e., a drop of water placed on the membrane shows no tendency to wet. Furthermore, the CWST of the membrane, empirically measured utilizing standard techniques discussed above, shows little or no change after the modification.

The filtration media of the present invention are prepared by treatment of the surfaces of polymeric porous substrates exhibiting the desired characteristics of being resistant, in their native state, to the chemical and corrosive action of a concentrated inorganic mineral acid. Upon modification, these substrates exhibit the ability to spontaneously and completely wet with the acid while maintaining chemical/corrosive resistance. Examples of suitable materials are fluoropolymers such as PVDF.

The porous polymeric media of the present invention are typically in the form of sheets of microporous membranes. The modified media may then be fashioned into filtration elements by suitable means. For example, membrane sheets may be cut into discs or corrugated and formed into cylindrical filter cartridges. Preformed microporous PVDF membranes are commercially available from a number of sources, for example DURAPORE® from Millipore Corporation and EMFLON II® from Pall Corporation. The membranes may contain a permanent internal non-woven support.

In order to produce a filter that exhibits the required low levels of extractable materials, support materials must be chosen which are resistant to a concentrated inorganic mineral acid. Typically, the support is a non-woven porous web or cloth. Examples of suitable non-woven webs include inter-entangled fluoropolymeric fibers and those comprising melt blown or melt spun polymers such as polyethylene, polypropylene, and PVDF.

Treatment of the medium of the present invention is carried out by contacting the substrate with a reagent capable of modifying the surfaces of the media. Useful reagents for modification include inorganic bases such as potassium hydroxide and sodium hydroxide and quaternary ammonium hydroxides such as tetramethylammonium hydroxide, tetraethylammonium hydroxide, tetrabutylammonium hydroxide, and tetrapropylammonium hydroxide. Preferred are the quaternary ammonium hydroxides because it is believed that they minimize ionic contamination produced with potassium and sodium, which are especially troublesome in the microelectronics industry. Most preferred, due to economic considerations, is tetramethylammonium hydroxide, hereinafter referred to as TMAH. TMAH may be purchased from a number of sources including Sachem, Inc. (Sachem), and Aldrich Chemical Company (Aldrich).

The reagent may be dissolved in any suitable solvent or solvent mixture that is compatible with the reagent and the membrane. The solvent must also be chosen so as to minimize the production of any side reactions that may result in leaching of undesirable contaminants when the filter is placed in service. For purposes of economy and ease of use, water is the preferred solvent for large scale production. When water is used as the solvent, however, the substrate must be pre-wet with a low surface tension fluid prior to carrying out the modification to insure total saturation with the reagent solution.

Other suitable solvents include liquids that have a low surface tension such as the alcohols methanol, ethanol, propanol, ethylene glycol, and propylene glycol since they spontaneously wet the substrate, thereby obviating the need to pre-wet the membrane prior to contact with the reagent solution. Of these, methanol is preferred due to its availability. The solvent is mixed with the reagent to create a solution of reagent in solvent ranging from about 15 weight percent to about 25 weight percent. Most preferred is a solution of 20 weight percent TMAH in solvent.

The porous substrate is saturated with the reagent solution by any appropriate means. Sheets of membrane may be dipped in a bath of solution, whereas continuous lengths of membrane may be saturated by known means of wet treatment of continuous, porous webs. For example, a continuous length of membrane may be passed through a bath containing the reagent solution, or it may be passed over a vacuum suction drum and the reagent solution drawn through the membrane. Alternatively, an entire roll of continuous porous membrane may be immersed in a vessel of reagent solution until fully and uniformly saturated with the solution.

Regardless of the manner in which the substrate is saturated with the reagent solution, it is exposed to the solution for a period of from about 2 minutes up to about 2 hours, preferably from about 5 to about 20 minutes, more preferably from about 10 to about 16 minutes. The duration of contact with the reagent solution is dependent upon the reagent used, the concentration of the reagent, temperature of the solution, voids volume of the media, and the thickness of the media. It is critical that the contact be for a period of time long enough to impart a spontaneously acid wettable characteristic to the medium but short enough that the physical strength and chemical/corrosive resistance of the medium are not affected significantly.

After contact with the reagent solution, the modified medium is washed with deionized water to remove undesirable contaminants, remaining reagent and reaction products. The medium may be further treated by flushing it with a dilute, e.g. 2%, solution of sulfuric acid for from about 10 to about 30 minutes to insure neutralization of basic constituents and then washing with deionized water. The medium is then dried. The dried medium can be incorporated into filter elements by means known to those skilled in the art.

In order to minimize the level of contaminants leached from the filter device of the present invention when it is placed into filtration service, hardware components which comprise such a device, must exhibit a high level of stability in the acid. For example, polypropylene, polyethylene and fluoropolymers such as PVDF, PTFE and FEP are all appropriate materials for filter element hardware.

In critical point-of-use filtration applications such as the microelectronics industry, it is imperative that the filter element exhibit extremely low levels of extractable material. In the filtration of highly corrosive fluids such as concentrated sulfuric acid, the level of contaminating organic material is most readily evidenced by the degree of color generated in the effluent. Utilizing standardized colorimetric assays, one can determine if the effluent has unacceptably high levels of organic extractables.

It has been determined that in order to provide a filter device which exhibits extremely low levels of effluent organic extractable material, it is desirable to pre-extract the element. Pre-extraction removes stabilizers or contaminants that may be present on the surfaces or in the bulk of the hardware materials. Pre-extraction may be accomplished by flushing the element with an organic solvent before modifying the media as described above. Solvents suitable for pre-extraction are low boiling organic liquids such as methylene chloride or ethanol. In a preferred method for pre-extraction, the element is placed in methylene chloride which is heated to reflux for a period of from about 4 to about 24 hours. The element is then dried by means known to those skilled in the art. After pre-extraction, the filter medium may be modified by treatment with a reagent solution as described above. The modified filter medium is then washed with deionized water and dried by conventional means.

In addition to reducing the level of undesirable organic extractables, it is also desirable to reduce the level of inorganic salts from the filter media. It has been determined that this can be accomplished by leaching the modified filter device with sulfuric acid for a period of from about 4 to about 24 hours. The concentration of sulfuric acid is preferably from about 70% to about 96%, most preferably 70%. After this leaching step, the filter device is washed with deionized water and dried by means known to those skilled in the art.

Filter elements made in accordance with this invention are in situ integrity testable. Forward flow testing has been widely accepted by the industry as a non destructive method for testing the integrity of a filter element. Forward flow testing of filter elements is discussed in detail in U.S. Pat. No. 4,340,479 which is incorporated herein by reference. A successful forward flow test indicates that the filter is completely wetted by the test fluid and that the filter has no holes or defects.

While the invention is susceptible to various modifications and alternative forms, certain specific embodiments thereof are described in the examples set forth below. It should be understood, however, that these examples are offered by way of illustration and not by way of limitation.

GENERAL METHOD A

The following general method represents an effective method for modifying PVDF sheet membrane. Sheets of microporous PVDF membrane are wrapped around a solid non-reactive rod, such as PTFE. Suitable microporous PVDF membranes are commercially available from Pall Corporation under the trademark EMFLON II ®. A reagent solution is prepared by mixing the desired base in an appropriate solvent. The PVDF sheets are immersed into the solution at room temperature with occasional agitation. The membrane sheets are then removed and washed with deionized water. After being rinsed, the sheets are dried.

As will be evident, Examples 1, 2, and 3 define a preferred range of treatment time with a reagent solution. Example 4 in conjunction with Example 1, establishes a preferred concentration range of reagent solution for the modification of PVDF membrane media.

EXAMPLE 1

PVDF membrane (EMFLON II ®) having dimensions of approximately 2 inches by 3 inches (5 cm by 7 cm) and a pore rating of $0.2\mu$ was modified according to General Method A described above. A reagent solution was prepared consisting of 20 weight percent tetramethylammonium hydroxide in methanol. The membrane was placed in the solution for 16 minutes. The membrane sheets were removed and washed with deionized water for 45 minutes. After being washed, the sheets were dried in a vacuum oven at 60° C. for one hour. A drop of concentrated sulfuric acid (purchased from J.T. Baker) was placed on the membrane and observed to spontaneously and completely wet the membrane. A drop of water applied to the membrane did not wet the membrane.

EXAMPLE 2

PVDF membrane was modified according to Example 1 described above, except that the time period of contact with the reagent solution was 5 minutes. After washing and drying the membrane, a drop of concentrated sulfuric acid was placed on the membrane. The drop did not wet the membrane, i.e. the drop remained beaded up on the membrane for several minutes.

EXAMPLE 3

PVDF membrane was modified according to Example 1 described above, except that the time period of contact with the reagent solution was 10 minutes. After washing and drying the membrane, a drop of concentrated sulfuric acid was placed on the membrane and was observed to spontaneously and completely wet the membrane. A drop of water placed on the membrane did not wet the membrane.

EXAMPLE 4

PVDF membrane was modified according to Example 1 described above except that the reagent solution consisted of 25 weight percent TMAH in methanol. The membrane was kept in the reagent solution for 5 minutes. After being removed from the reagent solution, the membrane was washed with deionized water for one hour, then dried in vacuo at 60° C. for approximately one hour. A drop of concentrated sulfuric acid was placed on the membrane and was observed to spontaneously and completely wet the membrane. A drop of water placed on the membrane did not wet the membrane.

The results of Examples 1, 2, 3 and 4 above indicate that the desired surface modification is controllable through the manipulation of the time of contact with a reagent solution and by changing the concentration of the reagent solution. Examples 1, 2 and 3 demonstrate that the desired modification can be achieved most effectively if contact is for a period of time between about 10 minutes and about 16 minutes with a reagent solution comprising 20 weight percent TMAH in methanol. Example 4 indicates that by increasing the concentration of the reagent, the period of contact time necessary to effect the desired modification can be reduced.

EXAMPLE 5

PVDF membrane was modified according to Example 1 described above. After washing and drying, the membrane was tested for its ability to spontaneously wet with a variety of fluids. A drop of each of the fluids listed in Table I was placed on the membrane and observed to see if it spontaneously and completely wet the membrane.

TABLE I

| Test Fluid | Surface Tension (dynes/cm) | Wets With Test Fluid |
|---|---|---|
| DI Water | 72 | No |
| 98% $H_2SO_4$* | 55 | Yes |
| 88% $H_2SO_4$** | 65 | Yes |
| 80% $H_2SO_4$** | 71 | No |
| 70% $HNO_3$* | 57 | Yes |

*Purchased from J. T. Baker
**Made by dilution of 98% $H_2SO_4$ with DI water

The data in Table I demonstrate that a PVDF membrane modified according to this invention is capable of spontaneously and completely wetting with concentrated sulfuric acid and 70% nitric acid. The data also demonstrates that, surprisingly, the modified membrane retains its hydrophobic characteristic and does not wet with water.

In Examples 6, 7 and 8 pre-assembled EMFLON II ® filter elements, were modified to spontaneously and completely wet with concentrated sulfuric acid and then "forward flow tested". In Examples 6, 7 and 8 concentrated sulfuric acid was used as the test fluid. Example 9 is a control experiment wherein a pre-assembled EMFLON II ® filter element, which was not modified, was forward flow tested in concentrated sulfuric acid.

EXAMPLE 6

A filter element containing a microporous PVDF membrane (EMFLON II ®) was modified and forward flow tested. A 10 inch high element containing 14 square feet of corrugated PVDF membrane, with a pore size rating of 0.2μ, cast on a polyolefin non-woven web was utilized. The remaining components of the element, which include end caps, core, cage, and a non-woven support and drainage material consisted of a polypropylene resin.

The element was placed into a stainless steel housing and flushed for approximately 10 minutes with a solution consisting of 20 weight percent tetramethylammonium hydroxide (TMAH) in methanol. The solution was prepared from 25 weight percent TMAH in methanol (purchased from Aldrich) and an appropriate amount of methanol (purchased from J.T. Baker).

Subsequent to the surface modification treatment, the reagent solution was allowed to drain out of the element. This procedure minimized residual fluid in the element, thereby facilitating sequential treatment with other fluids. The element was then flushed with deionized water for approximately 15 minutes in order to remove the reagent and terminate the modification reaction. The water was then allowed to drain from the element.

The modified element was washed with 2% aqueous sulfuric acid. The element was then drained, placed back into the stainless steel housing, and flushed with deionized water for approximately 30 minutes. The modified filter element was then dried in vacuo at 55° C. overnight.

The modified EMFLON II ® filter element was forward flow tested by the sequence described below. The element was placed into a filter housing and 96% sulfuric acid (purchased from J.T. Baker) was recirculated through the filter at a rate of 1 gallon per minute for approximately 10 minutes at ambient temperature. The liquid was allowed to drain from the filter housing for 20 minutes. After draining the sulfuric acid, a constant pressure of 10 psi air was applied to the upstream side of the element and diffusive air flow through the wetted membrane was measured. The test proceeded by increasing the applied pressure until a very large increase in air flow was observed, indicating that the capillary expulsion pressure had been exceeded and bulk air flow had commenced. Diffusive air flow through the filter, in standard cubic centimeters (sccm), was measured using a Gilmont Instruments, Inc. 2331 flow meter for pressures of 10 to 30 psi and a Gilmont Instruments, Inc. A7502 flow meter for pressures of 35 to 40 psi. See, for example, PALL INTEGRITY TEST GUIDE TR-100 © 1989, for a discussion on integrity test procedures. The results of the test are set out in Table II. The test was concluded when the measurement went "off scale", indicating that the liquid in pores of the membrane had become displaced and bulk air flow had commenced.

EXAMPLE 7

A second EMFLON II ® filter element which had been modified according to the method in Example 6 was forward flow tested. The results are set out in Table II.

EXAMPLE 8

A third EMFLON II ® filter element which had been modified according to the method in Example 6 was forward flow tested. The results are set out in Table II.

EXAMPLE 9

A filter element containing a microporous PVDF membrane (EMFLON II ®) was forward flow tested. A 10 inch high element containing 14 square feet of corrugated PVDF membrane, with a pore size rating of 0.2μ, cast on a polyolefin non-woven web was utilized. The remaining components of the element, which include end caps, core, cage, and a non-woven support and drainage material consisted of a polypropylene resin.

The EMFLON II ® filter element was pre-wet by the sequence described below. The element was wet with methanol. The wetted filter was flushed with deionized water to displace methanol. After flushing, the water was displaced from the element by reciprocating with 1 liter of 70% sulfuric acid. The 70% sulfuric acid was then displaced by reciprocating with one liter of concentrated (96%) sulfuric acid. This step was repeated to ensure complete wetting of the element with concentrated sulfuric acid.

After being pre-wet, the EMFLON II ® filter element was forward flow tested by the sequence described below. The element was placed into a filter housing and 96% sulfuric acid (purchased from J.T. Baker) was recirculated through the filter at a rate of 1 gallon per minute for approximately 10 minutes at ambient temperature and 5 psi. The liquid was allowed to drain from the filter for 20 minutes. After draining the sulfuric acid, a constant pressure of 10 psi air was applied to the upstream side of the element and diffusive air flow through the wetted membrane was measured. The test proceeded as described above in Example 6. The results of the test are set out in Table II. The test was concluded when the measurement went "off scale", indicating that the liquid in pores of the membrane had become displaced and bulk air flow had commenced.

TABLE II

| Example | Air pressure applied upstream (psi) | | | | | | | | | |
|---|---|---|---|---|---|---|---|---|---|---|
| | 10 | 15 | 20 | 25 | 30 | 35 | 36 | 37 | 38 | 39 | 40 |
| | Diffusive flow (sccm) | | | | | | | | | |
| 6 | 0.5 | 1.2 | 2.2 | 3.6 | 8.5 | 19 | 39 | 57 | 91 | 153 | * |
| 7 | 0.9 | 1.5 | 2.5 | 4.4 | 8.9 | 26 | 44 | 65 | 102 | * | |
| 8 | 0.4 | 1.2 | 2.3 | 3.8 | 6.5 | 24 | 40 | 67 | 125 | * | |
| 9 | 0.4 | 1.3 | 2.3 | 4.2 | 9.5 | 38 | 61 | 122 | 210 | * | |

*off readable scale of instrument

The data from Table II have been interpreted using the "$K_L$" method as described in U.S. Pat. No. 4,340,479, which has been incorporated herein by reference. In the $K_L$ method, air flow through a membrane wetted with a test fluid is measured downstream using a flowmeter. A slow increase in the applied pressure results in flow of air through the wetted membrane. This is due to diffusive flow caused by the solubility of air in the wetting fluid. A plot of flow/applied pressure on the y axis against applied pressure on the x axis yields a $K_L$ curve. For a perfectly wetted membrane, with uniform pores and no holes or defects, the $K_L$ curve will remain flat until a point is reached where a small increase in applied pressure will result in a large increase in flow. This will show up as an abrupt increase in the slope of the curve. This is the $K_L$ point of the membrane.

The membrane or filter device is observed to fail an integrity test when the $K_L$ curve is not flat, or nearly so, prior to reaching the inflection point. This will be the case if the membrane or filter device is not completely wetted with the test fluid, has non uniform pores, or has holes or defects.

The data from Table II has been plotted using the $K_L$ method and is displayed in FIG. 1. Example 9, an unmodified EMFLON II ® filter element, was pre wet using the complex and dangerous procedure described earlier. The $K_L$ plot obtained for this acid wet element shows the typical behavior for a uniform pore, perfectly wetted element with no holes or defects. Remarkably, the modified EMFLON II ® elements of Examples 6, 7 and 8 display the same $K_L$ behavior as the unmodified element of Example 9, without requiring the pre wetting procedure. This is a direct result of the fact that the three modified elements wet spontaneously and completely with the concentrated sulfuric acid, and clearly demonstrates that EMFLON II ® elements modified according to this invention are in situ integrity testable in concentrated sulfuric acid. These observations are surprising since the elements described in Examples 6, 7, 8 and 9 are all comprised of hydrophobic filtration media and do not wet with water.

In Examples 10 and 11 a filter element modified according to this invention, was tested for its ability to produce concentrated sulfuric acid effluent having low levels of extractable contamination. In order to demonstrate this, a colorimetric assay, which quantifies the level of color generated in the concentrated sulfuric acid effluent, was performed.

EXAMPLE 10

A supported 0.2μ PVDF membrane was corrugated with PVDF support and drainage fabric, placed into a polypropylene filter element cartridge, and fitted with polypropylene end caps, utilizing techniques well known to those skilled in the art.

Prior to modification, the element was pre-extracted to minimize the level of organic soluble contaminants in the polypropylene components. Pre-extraction of the element was accomplished by placing the element in 4 liters of methylene chloride (purchased from J.T. Baker) and heating to reflux overnight. The element was removed from the solvent, 1200 ml of fresh methylene chloride was recirculated through the element for a few minutes, and then the element was drained and dried in a vacuum oven at 55° C. overnight.

Modification of the filter medium of the pre-extracted filter was accomplished using an aqueous reagent solution. Prior to the introduction of reagent solution, the filter element was pre-wet with a solution comprising 25 weight percent tertiary butyl alcohol in deionized water. The pre-wet element was placed into a stainless steel housing, and flushed with flowing filtered deionized water for 10 minutes. Excess water was drained from the element. The reagent solution utilized for modification comprised 25 weight percent TMAH (purchased from Sachem Inc.), 0.13 weight percent tetrabutylammonium bromide (purchased from Aldrich) and the balance water.

Approximately three liters of reagent solution was recirculated through the element at a rate of 1 gallon per minute for 10 minutes. The reagent solution was drained and displaced by pressurizing the element upstream with 10 psi air, after which the filter was flushed with flowing filtered deionized water for 10 minutes.

The pre-extracted modified filter was then leached, in order to minimize the level of non-organic-soluble contaminants in the effluent. Leaching was accomplished by recirculating 70% sulfuric acid (purchased from Fisher Scientific) at 40° C. through the filter overnight. The acid was drained and displaced by pressurizing the element upstream with 10 psi air. The element was flushed with filtered deionized water for 1 hour and dried in a vacuum oven at 55° C. overnight.

EXAMPLE 11

Concentrated (96%) sulfuric acid (purchased from J.T. Baker) was recirculated for 20 minutes at ambient temperature in a PVDF filter housing to determine the influent quality of the acid. An aliquot of the acid was removed and analyzed for color using an Orbico-Hellige Aquatester and an APHA-Hazen Color Disc with a scale ranging from 0 to 25 APHA units. The sample displayed a color of 7.5 APHA units. The modified filter element of Example 9 was then installed in the PVDF housing and the acid was recirculated through the filter for 20 minutes. An aliquot of the effluent acid was removed and analyzed for color using the Orbico-Hellige Aquatester and the Hazen disc. The sample displayed a color of 10 APHA units. As noted above, the American Chemical Society Specification for concentrated sulfuric acid (95.0% to 98.0%) is an APHA color grade of 10 or less.

The results of Example 11 demonstrate that the modified filter element generated an extremely low level of color (2.5 APHA units) to concentrated sulfuric acid filtered through it. Furthermore, the effluent displayed an overall APHA color grade of 10, which is within the standards as specified by the American Chemical Society. These results demonstrate that the filter elements modified according to this invention, which spontaneously and completely wet with concentrated sulfuric acid, are capable of producing effluent that meets the American Chemical Society Specification for concentrated sulfuric acid.

Although the present invention has been described in terms of particular embodiments, it is not limited to these embodiments. Alternative embodiments and modifications which would be encompassed by the invention may be made by those skilled in the art, particularly in light of the foregoing teachings. Therefore, the following claims are intended to cover any alternative embodiments, modifications, or equivalents which may be included within the spirit and scope of the inventions as defined by the claims.

What is claimed is:

1. A filter device for the removal of contaminants present in an inorganic mineral acid comprising:
   a housing having an inlet and an outlet and defining a liquid flow path between the inlet and the outlet; and
   a hydrophobic fluoropolymeric porous membrane which wets spontaneously and completely with concentrated inorganic mineral acid, positioned inside the housing.

2. The filter, device of claim 1 wherein the hydrophobic membrane includes (poly) vinylidene difluoride.

3. The filter device of claim 1 wherein the hydrophobic membrane spontaneously and completely wets with concentrated sulfuric and nitric acid.

4. The filter device of claim 1 wherein the hydrophobic membrane comprises a membrane having an average pore size of from about 0.01 μm to about 1 μm.

5. The filter device of claim 1 wherein the hydrophobic membrane is supported on a non-woven polymeric sygart.

6. The filter device of claim 5 wherein the hydrophobic membrane includes an internal non-woven polymeric support.

7. The filter device of claim 6 wherein the internal non-woven polymeric support comprises a non-woven web which includes polyethylene, polypropylene of (poly) vinylidene difluoride.

8. The filter device of claim 5 wherein the hydrophobic membrane comprises (poly) vinylidene difluoride modified by treatment with a base, which renders the membrane both hydrophobic and spontaneously and completely wettable with concentrated sulfuric acid.

9. The filter device of claim 8 wherein the vinylidene difluoride is modified by treatment with a quaternary ammonium hydroxide.

10. The filter device of claim 1 wherein the hydrophobic membrane is n the form of a flat disc.

11. The filter device of claim 1 wherein the hydrophobic membrane is in the form of a corrugated membrane cartridge.

12. The filter device of claim 1 wherein the hydrophobic fluoropolymeric porous membrane comprises a (poly) vinylidene difluoride microporous membrane, wherein the device further comprises (poly) vinylidene difluoride non-woven fibrous support and drainage components operatively associated with the (poly) vinylidene difluoride microporous membrane, and wherein the (poly) vinylidene difluoride microporous membrane and (poly) vinylidene difluoride non-woven fibrous support and drainage components have been modified to be both hydrophobic and spontaneously and completely wettable with concentrated sulfuric acid.

13. A method for filtering a concentrated inorganic mineral acid comprising the steps of passing the acid through the filter device of claim 1.

14. A method for filtering a concentrated inorganic mineral acid comprising the step of passing a concentrated inorganic mineral acid through a hydrophobic (poly) vinylidene difluoride porous membrane which spontaneously and completely wets with the acid.

15. The method of claim 14 wherein the membrane has a pore size of from about 0.01 μm to about 1 μm.

16. The method of claim 25 wherein the hydrophobic membrane is in the form of a flat disc.

17. The method of claim 15 wherein the hydrophobic membrane is in the form of a corrugated membrane cartridge.

18. A process for making a filter suitable for removing contaminants from inorganic mineral acids, the process comprising;
   a) immersing a hydrophobic fluoropolymeric porous membrane into a solution, which includes a quaternary ammonium hydroxide, so as to modify the membrane to be both hydrophobic and spontaneously and completely wettable with concentrated inorganic mineral acid; and
   b) flushing the membrane with deionized water.

19. The process of claim 18 wherein immersing the hydrophobic membrane comprises immersing a vinylidene difluoride membrane into the solution including the quaternary ammonium hydroxide.

20. The process of claim 19 wherein immersing the hydrophobic membrane comprises immersing a (poly) vinylidene difluoride membrane into a methanol solution which includes tetramethylammonium hydroxide.

21. The process of claim 18 further comprising initially wetting the hydrophobic membrane with a low surface tension liquid; and wherein immersing the hydrophobic membrane comprises immersing a (poly) vinylidene difluoride porous membrane into an aqueous solution which includes the quaternary ammonium hydroxide.

22. The process of claim 18 comprising immersing a hydrophobic fluoropolymeric porous membrane into a solution, which includes a quaternary ammonium hydroxide, for a period of from about 2 minutes to about 2 hours.

23. A porous medium comprising a hydrophobic fluoropolymeric microporous membrane which wets spontaneously and completely with concentrated inorganic mineral acid.

24. The porous medium of claim 23 wherein the hydrophobic fluoropolymeric microporous membrane comprises vinylidene difluoride modified by treatment with a quaternary ammonium hydroxide.

25. The porous medium of claim 24 further comprising (poly) vinylidene difluoride non-woven fibrous support and drainage components operatively associated with the hydrophobic microporous membrane, wherein the (poly) vinylidene difluoride support and drainage components have been modified to be both hydrophobic and spontaneously and completely wettable with concentrated inorganic mineral acid.

* * * * *

UNITED STATES PATENT AND TRADEMARK OFFICE
CERTIFICATE OF CORRECTION

PATENT NO. : 5,275,738
DATED : January 4, 1994
INVENTOR(S) : Salinaro et al.

It is certified that error appears in the above-indentified patent and that said Letters Patent is hereby corrected as shown below:

Col. 13, line 44, change "sygart" to --support--.

Col. 13, line 50, change "of" to --or--.
Col. 13, line 57, after "the" (second occurrence) insert --(poly)--.
Col. 13, line 60, change "n" to --in--.
Col. 14, line 26, change ";" to --:--.
Col. 14, line 34, after "a" insert --(poly)--.
Col. 14, line 58, after "comprises" insert --(poly)--.

Signed and Sealed this

Eighteenth Day of October, 1994

Attest:

BRUCE LEHMAN

Attesting Officer  Commissioner of Patents and Trademarks